United States Patent
Zobel

(10) Patent No.: US 8,953,842 B2
(45) Date of Patent: Feb. 10, 2015

(54) METHOD FOR ROAD SIGN RECOGNITION

(75) Inventor: Matthias Zobel, Wasserburg (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 159 days.

(21) Appl. No.: 13/696,851

(22) PCT Filed: Apr. 28, 2011

(86) PCT No.: PCT/DE2011/000458
§ 371 (c)(1),
(2), (4) Date: Nov. 8, 2012

(87) PCT Pub. No.: WO2011/141016
PCT Pub. Date: Nov. 17, 2011

(65) Prior Publication Data
US 2013/0058534 A1 Mar. 7, 2013

(30) Foreign Application Priority Data
May 14, 2010 (DE) .......................... 10 2010 020 330

(51) Int. Cl.
G06K 9/00 (2006.01)
G06K 9/50 (2006.01)

(52) U.S. Cl.
CPC .............. *G06K 9/50* (2013.01); *G06K 9/00818* (2013.01)
USPC ........................................................ 382/103

(58) Field of Classification Search
None
See application file for complete search history.

(56) References Cited

U.S. PATENT DOCUMENTS

| | | | |
|---|---|---|---|
| 4,566,124 A * | 1/1986 | Yamamoto et al. | 382/185 |
| 4,901,362 A | 2/1990 | Terzian | |
| 5,594,806 A * | 1/1997 | Colbert | 382/115 |
| 6,690,842 B1 * | 2/2004 | Silver et al. | 382/300 |
| 6,801,638 B1 | 10/2004 | Janssen et al. | |
| 7,058,206 B1 | 6/2006 | Janssen et al. | |
| 7,466,841 B2 * | 12/2008 | Bahlmann et al. | 382/103 |
| 2005/0111698 A1 * | 5/2005 | Kawai | 382/103 |
| 2006/0098877 A1 * | 5/2006 | Barnes et al. | 382/203 |

(Continued)

FOREIGN PATENT DOCUMENTS

| | | |
|---|---|---|
| DE | 198 52 631 | 5/2000 |
| DE | 102006053289 | 5/2000 |

(Continued)

OTHER PUBLICATIONS

PCT Examiner Hasan Celik, International Search Report of the International Searching Authority for International Application PCT/DE2011/000458, mailed Sep. 5, 2011, 3 pages, European Patent Office, HV Rijswijk, Netherlands.

(Continued)

*Primary Examiner* — Shervin Nakhjavan
(74) *Attorney, Agent, or Firm* — W. F. Fasse

(57) ABSTRACT

For recognizing road signs, a camera captures image data of the surroundings of a vehicle. The image data are analyzed to determine a region that contains a potential road sign. The image region is evaluated by a first classification unit to identify a road sign belonging to a particular class based on a recognized class-specific feature. Then, the brightness or color intensity of at least a portion of the road sign is analyzed along radially extending scanning beams, to determine potential contour points of an information-bearing part of the road sign, which is then extracted and semantically interpreted in a second classification unit to determine the information content thereof.

20 Claims, 6 Drawing Sheets

(56) References Cited

U.S. PATENT DOCUMENTS

| | | | |
|---|---|---|---|
| 2008/0107345 A1 | 5/2008 | Melikian | |
| 2008/0199050 A1* | 8/2008 | Koitabashi | 382/107 |
| 2009/0074249 A1* | 3/2009 | Moed et al. | 382/104 |
| 2010/0067805 A1* | 3/2010 | Klefenz | 382/201 |
| 2010/0328316 A1* | 12/2010 | Stroila et al. | 345/441 |
| 2013/0011016 A1* | 1/2013 | Haas et al. | 382/103 |

FOREIGN PATENT DOCUMENTS

| | | | |
|---|---|---|---|
| DE | 102005017541 | 10/2006 | |
| DE | 102005062154 | 7/2007 | |
| DE | 102006053289 A1 * | 5/2008 | B60Q 9/00 |
| DE | 102008057675 | 7/2009 | |
| DE | 102010020330 | 11/2011 | |
| EP | 0 149 457 | 7/1985 | |
| WO | WO 91/17518 | 11/1991 | |

OTHER PUBLICATIONS

PCT Examiner Agnès Wittmann-Regis, PCT International Preliminary Report on Patentability including English Translation of PCT Written Opinion of the International Searching Authority for International Application PCT/DE2011/000458, issued Nov. 20, 2012, 8 pages, International Bureau of WIPO, Geneva, Switzerland.

German Examiner Harry Hoffmeister, German Search Report for German Application No. 10 2010 020 330.0, dated Mar. 30, 2011, 4 pages, Muenchen, Germany, with English translation, 4 pages.

Yongping Wang et al., "A Method of Fast and Robust for Traffic Sign Recognition", Fifth International Conference on Image and Graphics, Sep. 20, 2009, IEEE, NJ, USA, XP031652742, pp. 891 to 895.

X. W. Gao et al., "Recognition of traffic signs based on their colour and shape features extracted using human vision models", Journal of Visual Communication and Image Representation, vol. 17, Issue 4, Aug. 2006, pp. 675 to 685.

* cited by examiner

METHOD FOR ROAD SIGN RECOGNITION

FIELD OF THE INVENTION

The invention relates to a method for road sign recognition and to a corresponding device.

BACKGROUND INFORMATION

Modern driver assistance systems are being increasingly equipped with an electronic road sign recognition system in order to, e.g., warn the driver in the event of speeding. For this purpose, a camera acquires images of the region in front of the vehicle and delivers corresponding image data to an onboard computer that analyzes and classifies the image data by means of an algorithm in order to identify a road sign therefrom. Such a method is known from, e.g., DE 198 52 631 A1.

According to known methods for road sign recognition, image regions that may contain potential road signs are identified in the camera image in a detection phase. After that, in a second procedure step, these potential road signs are submitted to a classificator that decides whether a road sign is present in the image region and which road sign it is.

The classificator or classification unit may operate in a learning-based manner, which is known from, e.g., DE 10 2005 062 154 A1 where the classificator is appropriately trained in advance using a set of learning examples whose specific designs depend on the selected detection method. For example, a known method for speed limit recognition consists in searching for circles in the camera image by means of image processing phases during the detection phase and submitting the surrounding rectangle as an image detail to the classificator, wherein this feature "circles" defines a particular class of road signs. Such a method for the recognition of circular objects in image data of an image sensor is known from DE 10 2005 017 541 A1.

SUMMARY OF THE INVENTION

The object of the invention is to provide a road sign recognition method that makes fast and reliable road sign recognition possible and only makes low demands on the resources of a control unit. Especially for use in embedded systems, a low computing load of the used methods is one of the challenging development objectives.

According to an embodiment of an inventive method for road sign recognition, images of a region surrounding the vehicle are acquired by means of a camera. The image data of the camera are analyzed, wherein at least one image region that contains a potential road sign is determined. An example therefor is the search for circular objects in the image. The image region that contains the potential road sign is submitted to a first classification unit that identifies the potential road sign, on the basis of at least one class-specific feature, as a road sign belonging to this particular class, and the analysis of the image detail that contains the road sign is continued. An image region containing a potential road sign in which the first classification unit cannot identify this potential road sign as a road sign belonging to a particular class is preferably rejected and further image data are analyzed.

For example, if a circular road sign has a white circular background and a red outer ring as a class-specific feature, the road sign is identified as a road sign belonging to this class. In particular, speed limit signs belong to this class. Several European countries partially agreed on a standardization of road signs (Vienna Convention on Road Signs and Signals), e.g., on a characteristic design of speed limit signs (circular sign having a red outer ring and a number indicating the speed limit).

In order to identify the present road sign, according to an embodiment of the inventive method, the information-bearing part is determined in a first step and submitted to a second classification unit for determining the contents in a second step. The information-bearing part of a road sign may be, e.g., the numerical value of a speed limit (also referred to as numerical block in the following). Alternatively or cumulatively, the information-bearing part comprises letters and/or symbols, e.g., the symbol that indicates a restriction on passing.

In a first step for determining the information-bearing part of a road sign, the brightness of the or the color intensity of the surface of the road sign is analyzed along radially extending scanning beams starting from a starting point within the surface of the road sign. A color intensity analysis is an analysis of one or more color intensity value(s) (e.g., RGB values or CMY values) of a pixel in comparison with a pixel that is adjacent along the scanning beam, whereby color transitions (e.g., from red to white) are determined, wherein brightness or color intensity is preferably analyzed from the starting point of the surface of the road sign outward along the scanning beams. Potential contour points of an information-bearing part of the road sign are determined from the results of brightness or color intensity analysis. In other words, the brightness boundary or color intensity boundary defined by the contour of the information-bearing part or of the numerical block is determined. Afterwards, a region of the surface of the road sign is extracted as an information-bearing part of the road sign that includes all determined potential contour points. The extracted region is submitted to a second classification unit for semantic interpretation, i.e., this classification unit reads out the contents of the extracted region (e.g., the value of the speed limit indicated on the road sign) so that, e.g., the information "Recognition of a road sign 'Speed limit of 60 km/h' in the camera image" can be outputted at the end of the procedure. This information may be indicated to the driver, e.g., on a display or made available to further assistance systems.

The inventive method advantageously stands out due to the brightness or color intensity analysis performed along scanning beams that makes considerably lower demands on computing capacity and memories than two-dimensional edge detection operators (e.g., Sobel or Canny operators) that are typically used for road sign recognition, whereby the road sign is determined faster. Moreover, the method is very robust since the information-bearing part is determined on the basis of its contour. Comparable methods for road sign recognition are often dependent on the information-bearing part always having a standard size and standard position within the road sign since otherwise the information-bearing part cannot be recognized or cannot be recognized correctly.

In an advantageous realization of the invention, the first classification unit defines the starting point for brightness analysis or color intensity analysis, from which starting point the scanning beams preferably extend outward. When identifying a potential road sign as a road sign belonging to a particular class, the first classification unit may define a suitable starting point for determining the information-bearing part of the road sign of this class.

In an advantageous realization of the invention, the center of the surface of the road sign is determined and used as a defined starting point from which the scanning beams radially extend.

Brightness analysis or color intensity analysis preferably comprises a one-dimensional gradient formation of the brightness values of or color intensity values of the pixels along the scanning beams, i.e., the brightness difference or color intensity difference between adjacent pixels is determined on each scanning beam, wherein potential contour points are determined from maxima of gradient formation. The calculation of the one-dimensional gradient is considerably easier and thus faster than the calculation required when using two-dimensional edge detection operators that is often used for road sign recognition.

According to a preferred embodiment, the first classification unit determines the inner surface of the road sign of a particular class. The brightness or color intensity analysis along the scanning beams is then only performed within the inner surface of the road sign. For example, if the first classification unit identifies a road sign belonging to the class "White circular background with a red outer ring", brightness or color intensity analysis can be restricted to the region of the inner white circular background. For this purpose, this region may be masked or the length of the scanning beams may be adapted to the dimension of the background or of the inner surface.

In a preferred embodiment, that region of a bright-background road sign for which the potential contour points were determined as dark-to-bright transitions in a brightness analysis performed from the starting point outward is extracted as an information-bearing part, wherein the region in which brightness is analyzed should be adapted corresponding to the preceding embodiment, thereby ensuring that the complete numerical block or the complete information-bearing part of the road sign is extracted and forwarded. The selection of the furthest-from-center potential contour points from dark-to-bright transitions prevents potential relevant pixels or signs/symbols of the road sign from not being extracted and prevents the road sign from being misinterpreted or being not recognized by the second classification unit.

In a preferred embodiment, that region of a dark-background road sign for which the potential contour points were determined as bright-to-dark transitions in a brightness analysis performed from the starting point outward is extracted as an information-bearing part. Such a representation of road signs can be found on, e.g., electronic display panels having a black background.

In an advantageous embodiment of the method for road sign recognition, the smallest rectangle that includes all potential contour points is that region of a road sign which is extracted as an information-bearing part, wherein only that region which contains the information required for classification is submitted to the second classification unit for semantic interpretation, thereby minimizing the memory required for classification and the time required therefor.

In a preferred realization of the method for road sign recognition, the surface of the road sign is, prior to brightness or color intensity analysis, subjected to brightness normalization, noise suppression, masking the region that surrounds the surface and/or further processing, in which the region surrounding the surface or the surface itself is cleared of any influences that have a negative effect on the brightness analysis of or the color intensity analysis of the surface, thereby advantageously forwarding cleared image details that not only simplify the determination of the information-bearing part of the road sign but also support said determination, which is the case if, e.g., the pixels of the image detail that contains the road sign are assigned to one brightness value each, i.e., all pixels that are dark/not bright are assigned to a particular dark brightness value and all pixels that are bright/not dark are assigned to a bright brightness value (i.e., a conversion of the image detail into a binary black-and-white image, for example).

In an advantageous embodiment of the method for road sign recognition, the brightness or color intensity analysis of the surface of the road sign is performed along a particular number of radially extending scanning beams, wherein the number of radially extending scanning beams depends on the determined number of image regions with potential road signs in a camera image or on the number of the road signs identified in a camera image by the first classification unit, whereby the available computing power for determining the information-bearing part of road signs can be adapted to the potential or provisionally identified road signs that simultaneously appeared in a camera image.

In a further preferred embodiment of the method, a minimum number of radially extending scanning beams (e.g., four or eight) is predetermined in a first run. The region extracted in this manner is submitted to the second classification unit for contents interpretation. If the classification unit cannot classify the extracted region successfully, the number of scanning beams is increased continuously, e.g., by one or two further scanning beams, or the number is doubled. This advantageously enables the road sign to be classified with the onboard computer or control unit being utilized according to the actual demand. Moreover, the time required for determination can be further reduced if, e.g., four scanning beams are already sufficient (in comparison with eight provided scanning beams).

Preferably, the number of scanning beams in the preceding embodiment is only increased up to a defined maximum number. Thus, a maximum degree of utilization of the onboard computer or control unit is defined by this method.

In an advantageous embodiment of the method for road sign recognition, all angles between adjacent scanning beams radially extending from the starting point outward have the same size.

Particularly preferably, twenty-four scanning beams are provided, wherein all angles between adjacent scanning beams have a size of 15°. In many cases, the use of twenty-four scanning beams ensures a sufficiently reliable determination of the numerical block/of the information-bearing part. Misinterpretation of the road sign by the second classification unit is prevented and the number of cases in which the road sign cannot be recognized is minimized. Moreover, the maximum degree of utilization of a memory and of the onboard computer or control unit is advantageously defined.

The subject matter of the invention is furthermore a device for road sign recognition that comprises a camera for acquiring images of a region surrounding the vehicle and an image processing unit. A first classification unit comprises means for determining an information-bearing part of a road sign from the image data of the camera. Means for extracting that region of the road sign which comprises the information-bearing part as well as for forwarding to a second classification unit for semantic interpretation are provided.

BRIEF DESCRIPTION OF THE DRAWINGS

Further advantages of the invention can be inferred from the description and the drawings. Exemplary embodiments are shown in the drawing in a simplified manner and will be explained in greater detail in the following description.

DETAILED DESCRIPTION OF EXAMPLE EMBODIMENTS OF THE INVENTION

Figure 1A:
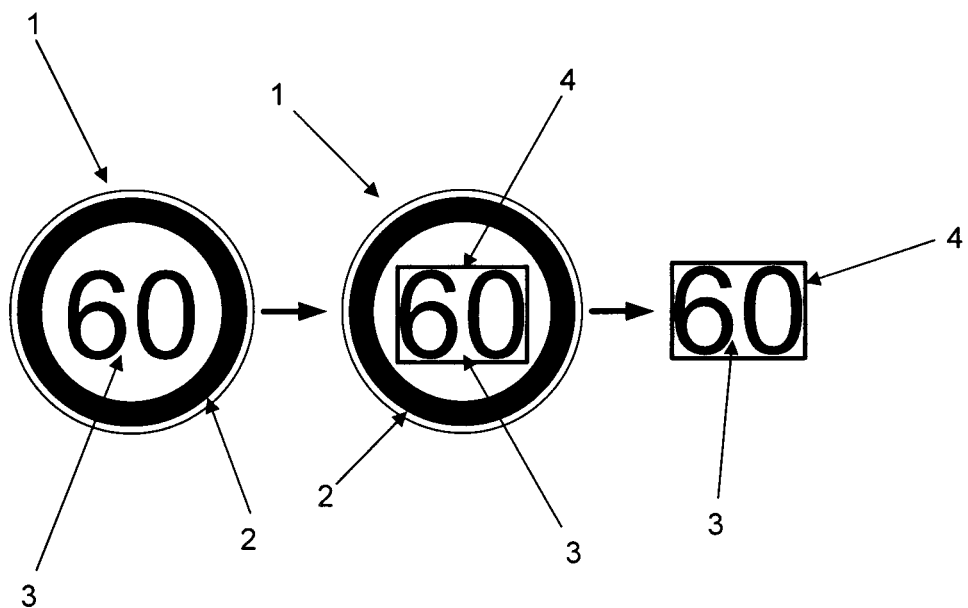
FIG. 1a shows a schematic representation of the extraction of a numerical information-bearing part of a road sign.

FIG. 1a shows a road sign 1 that belongs to the class of commanding and prohibiting signs and is a speed limit sign 1. The class of speed limit signs 1 is circular and has a red edge 2 and ideally indicates the speed limit as a centered number on the inner surface 17 within the red edge 2. In FIG. 1a, the road sign 1 indicates a speed limit of "60" (kilometers per hour) by way of example. This value is the information-bearing part 3 of the road sign 1 and is also referred to as numerical block. In FIG. 1a, the road sign 1 as such is shown on the left, a boundary frame 4 enclosing the information-bearing part 3 of the road sign 1 is shown in addition in the middle, and the extracted information-bearing part 3 with the boundary frame 4 is shown on the right.

Figure 1B:
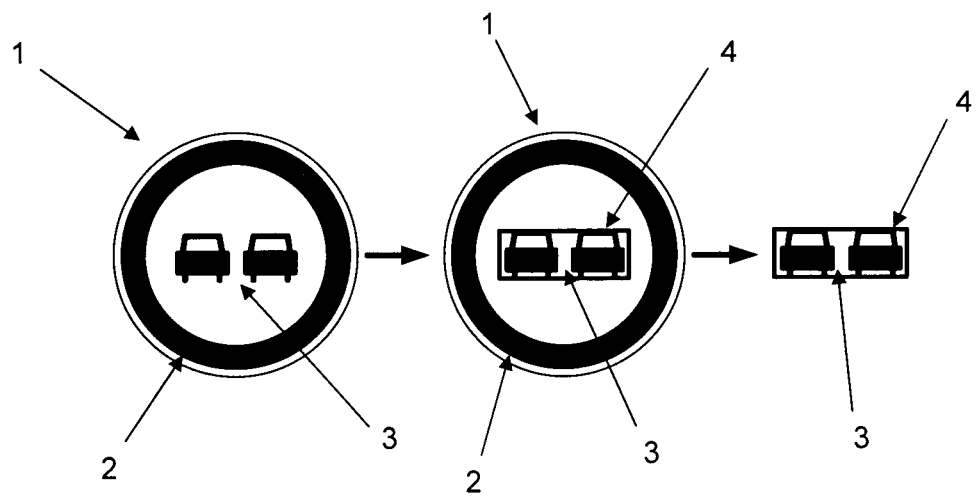
FIG. 1b shows the extraction of an information-bearing part of a road sign with symbolic information.

By analogy with FIG. 1a, FIG. 1b shows the representations for a road sign 1 that indicates a restriction on passing. In contrast to the speed limit sign in FIG. 1a, the information-bearing part 3 of the road sign in FIG. 1b is a symbol: a rear view of a red car on the left, next to a black car on the right (for driving on the right). The information-bearing part 3 could also comprise letters (e.g., "3.8 m"—maximum admissible actual height in meters).

Figure 2:
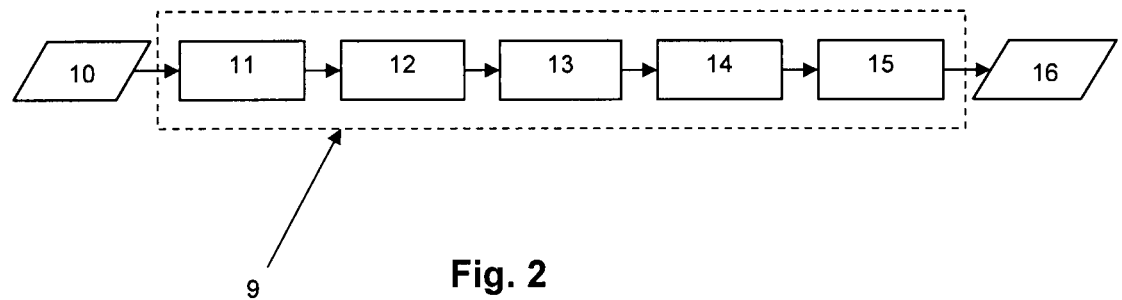
FIG. 2 shows a flow chart of the procedure for extracting the information-bearing part of a road sign.

The flow chart in FIG. 2 shows the course of a procedure for extracting the information-bearing part 3 of a road sign 1 (referred to as extraction procedure 9 in the following). The information-bearing part 3 of the road sign 1 will be also referred to as numerical block in the following since a speed limit as shown in FIG. 1a is to be extracted or recognized here by way of example.

After identifying a region with a road sign 1 in a camera image, this image detail 10 that contains the complete road sign 1 (i.e., edge 2 and numerical block) is preprocessed in an optional first procedure step 11. The image detail 10 may be subjected to noise suppression, brightness normalization, or masking the red edge 2 of the road sign 1.

In a second procedure step 12, the possibly preprocessed image detail 10 is "scanned", wherein brightness values or color intensity values of the pixels of the image detail 10 are scanned starting from the starting point (in this case, the center 8 of the surface of the road sign 1) along a set of radial scanning beams 5 and the brightness values or color intensity values are stored.

In a third procedure step 13, a gradient formation of the brightness values or color intensity values along these scanning beams 5 is performed. By the one-dimensional gradient formation on the pixels of the numerical block along the scanning beams 5, the brightness difference or color intensity difference between adjacent pixels is determined on each scanning beam 5. The brightness differences or color intensity differences in the scanned pixels are stored after the determination of the brightness differences or color intensity differences.

In a fourth procedure step 14, contour point hypotheses are formed from the determined brightness differences or color intensity differences. From the stored brightness differences or color intensity differences and the stored brightness values or color intensity values along the individual scanning beams 5, the potential contour points 6 of the numerical block are determined at points of great brightness differences or color intensity differences, wherein, e.g., for recognizing a road sign 1 having a dark numerical block on a bright background, only those contour points which correspond to a dark-to-bright transition are taken into consideration.

Figure 3:
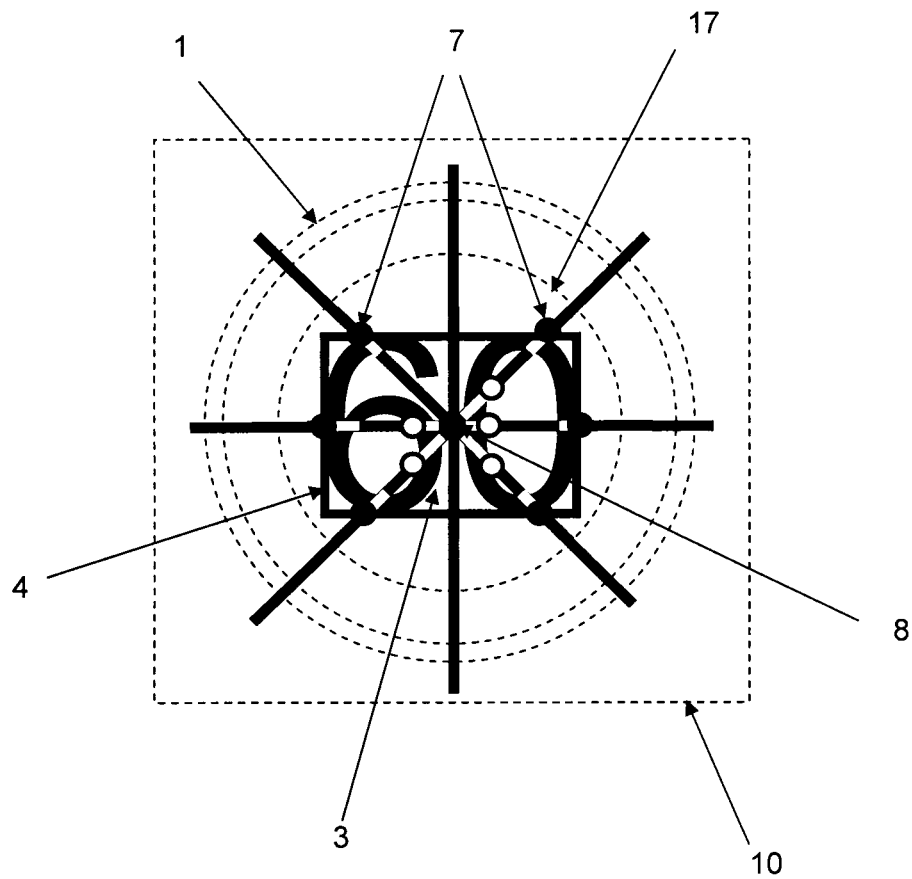
FIG. 3 shows a masked road sign with potential contour points of the information-bearing part.

In a fifth procedure step 15, the numerical block is extracted, wherein actual contour points 7 can be determined from the contour point hypotheses or the potential contour points 6 by determining the outermost potential contour point 6 on each scanning beam 5, wherein it should be ensured that actual contour points 7 are located only within the inner surface 17 of the road sign 1. That region which contains all contour points 7 is determined, wherein that region also contains all potential contour points 6 and may be the smallest rectangle that circumscribes the contour and includes all potential contour points 6. The boundary frame 4 in FIGS. 3, 4c and 4d represents the rectangle that circumscribes the contour. The contour/the boundary frame 4 with the numerical block contained therein from the image detail 10 is extracted, whereafter the information-bearing part 3/the numerical block is outputted (see 16). After the extraction procedure 9, the extracted numerical block may be indicated to the driver in a display unit of the vehicle or forwarded for further processing (in particular, subjected to semantic interpretation).

FIG. 3 shows a masked road sign 1. After preprocessing, the image detail 10 is cleared of pixels or interferences so that only the region of the inner surface 17 (within the innermost dashed circle) is subjected to brightness analysis. The red edge 2 and the outer edge of the road sign 1 (outer dashed circles) are not taken into consideration since here false potential contour points 6 could be determined along the scanning beams 5 during brightness analysis.

For example, the red edge 2 and pixels that are located further on the outside could be overwritten with suitable pixels. For example, the edge 2 can be replaced with pixels corresponding to the pixels of the surroundings of the numerical block or of the background of the road sign 1. In this case, the length of the scanning beams 5 is irrelevant. The red edge could also be recognized by means of a color intensity analysis performed along the scanning beams 5 (e.g., as a white-to-red transition in the outer region).

Figure 4A:
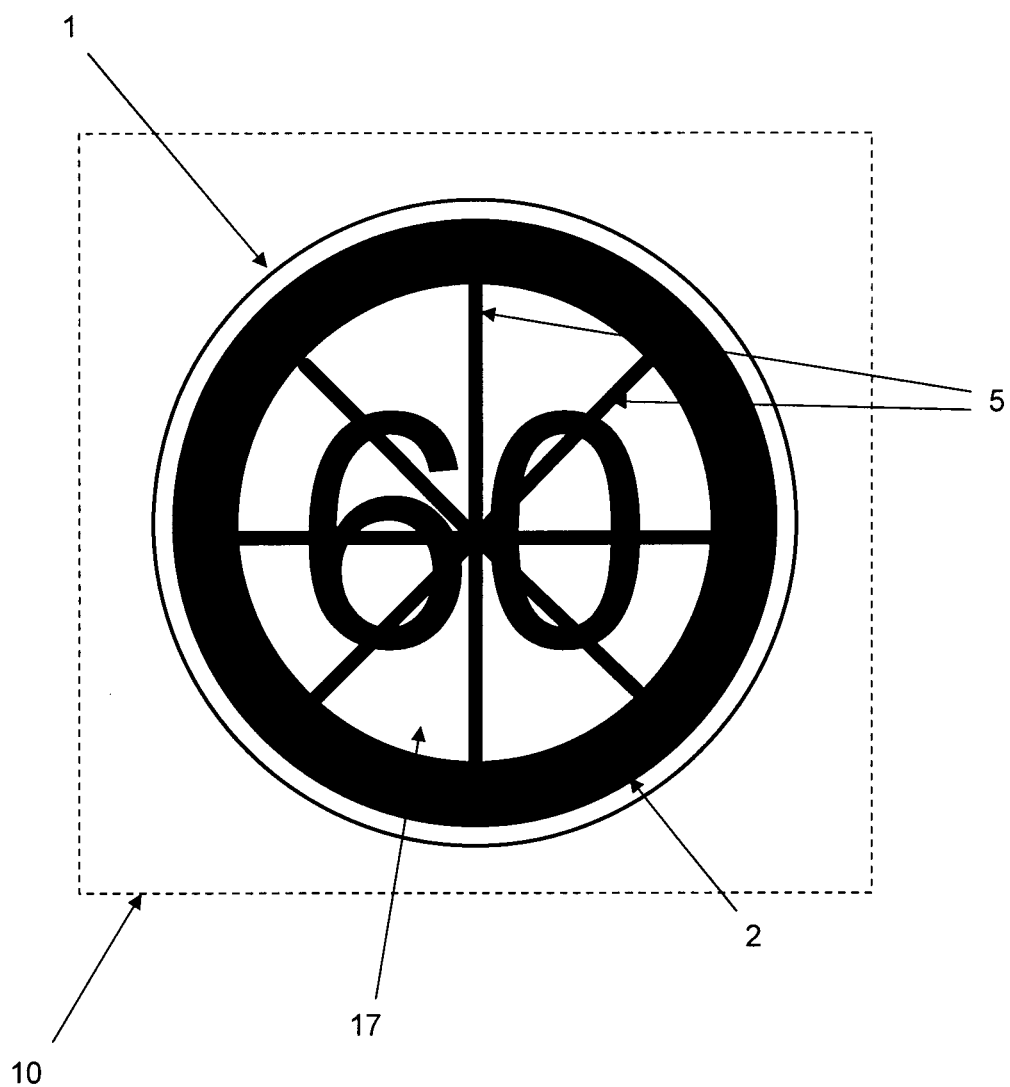
FIGS. 4a to d show the determination of the information-bearing part on the inner surface of a road sign by means of brightness analysis performed along scanning beams.

FIG. 4a shows an image detail 10 that contains a road sign 1 identified by a first classification unit, on the basis of its white circular background or inner surface 17 and its annular red edge 2, as a road sign 1 having these characteristic features. The first classification can also provide the information about the position of and the dimension of the inner surface 17.

In this case, the center 8 of the inner surface 17 of the road sign 1 is a suitable starting point for determining the contour of the information-bearing part 3. Eight scanning beams 5 radially extending from this starting point outward up to the edge of the inner surface 17 are provided, wherein all angles between adjacent scanning beams have a size of 45°. Along these scanning beams 5, the brightness of those pixels of the image detail 10 which are located along the scanning beams 5 is determined from the starting point outward. Alternatively, a color intensity analysis could be performed instead of the brightness analysis. However, the brightness analysis described in the following is most suitable for the road sign 1 shown.

The method starts out from the fact that the brightness of the numerical block/the information-bearing part 3 differs from the brightness of the region of the inner surface 17 that surrounds the numerical block/the information-bearing part 3. Therefore, the brightness boundary defined by the contour of the numerical block is searched for during brightness analysis. The brightness differences between adjacent pixels are then determined and stored during brightness analysis.

Figure 4B:
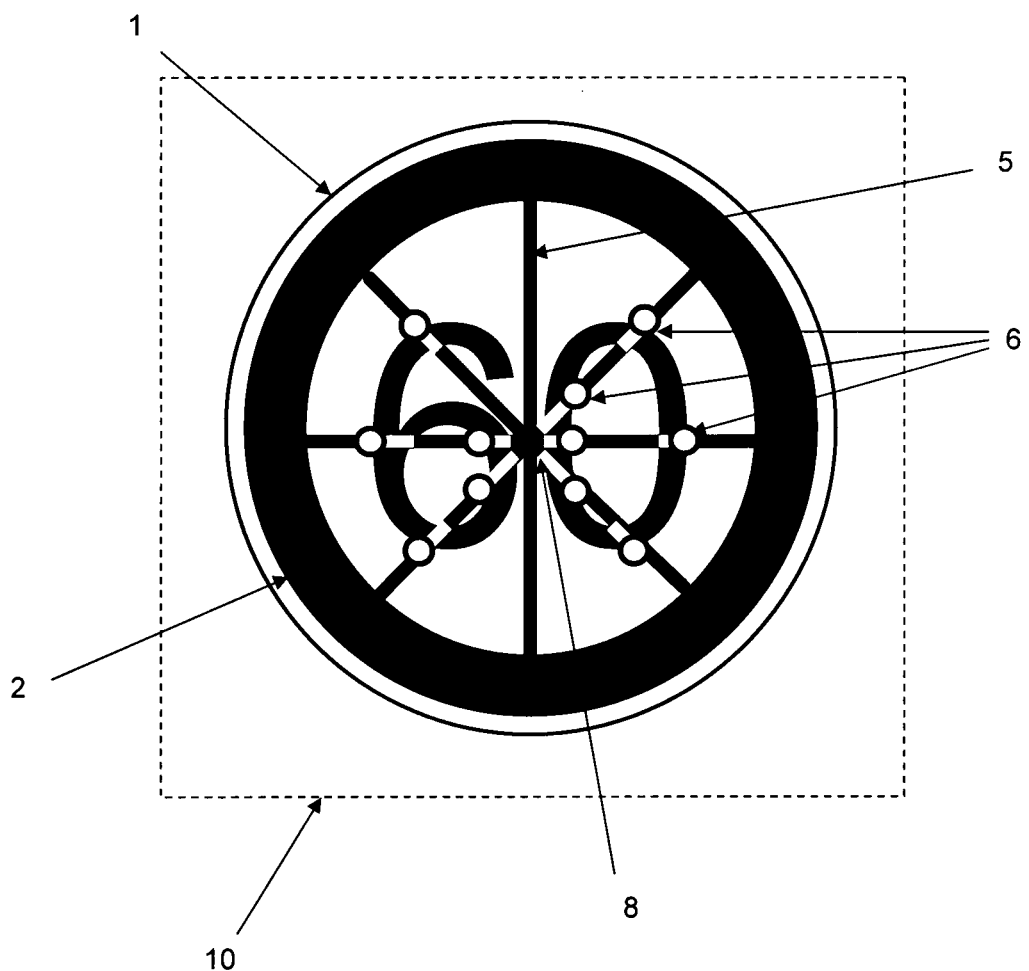
Figure 4C:
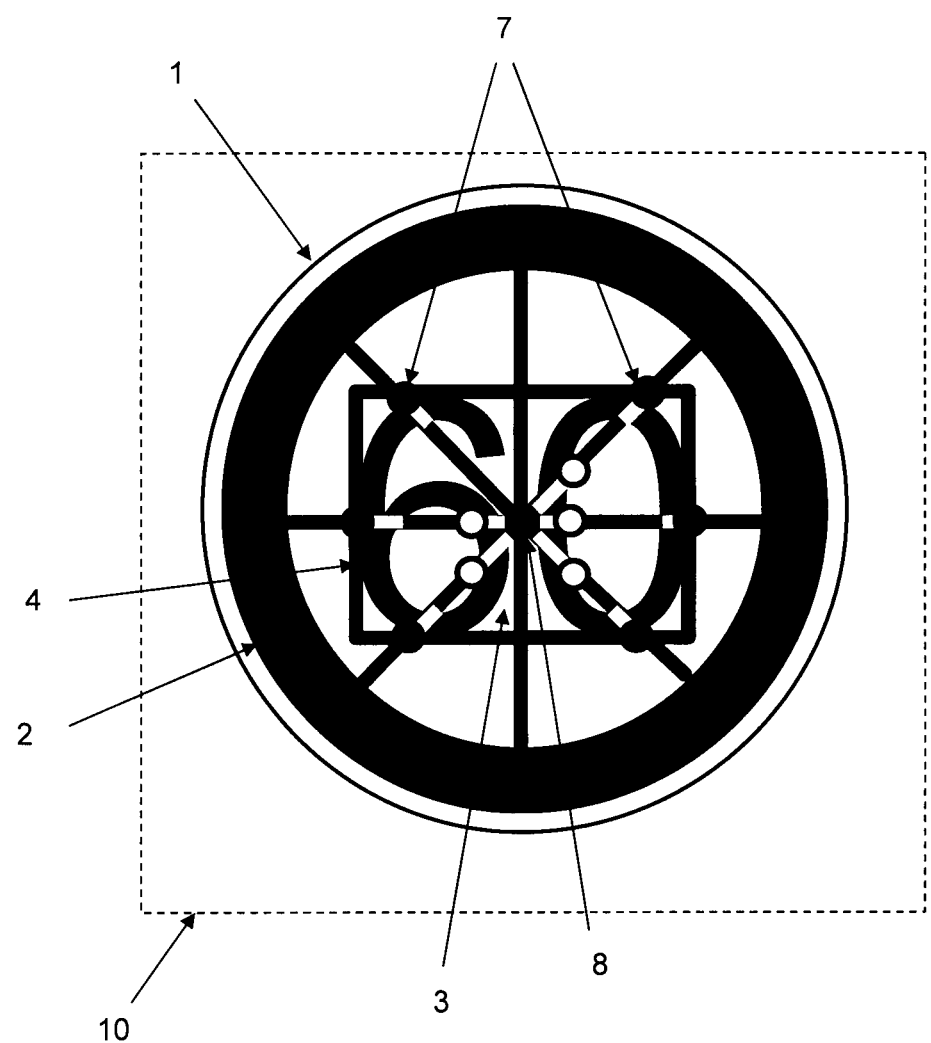
Figure 4D:
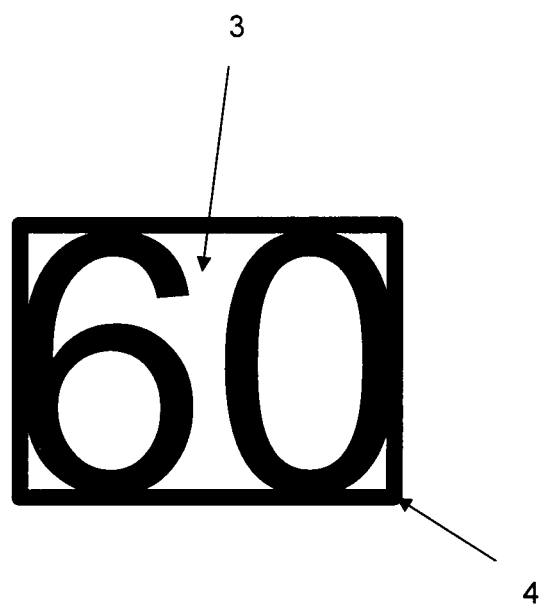

FIG. 4b shows the potential contour points 6 that result from the determined and stored pixels having different brightness values. Since the road sign 1 shown has a bright inner region 17 (e.g., white pixels) and a dark numerical block (e.g., black pixels), the potential contour points 6 correspond to the brightness changes with dark-to-bright transitions from the inside outward.

FIG. 4c shows which potential contour points 6 correspond to actual contour points 7 and how the determined contour points (6 or 7) are subsequently used for the extraction of the numerical block. Those potential contour points 6 which are furthest from the starting point on their scanning beams 5 correspond to actual contour points 7 since they define the contour boundary of the information-bearing part 3 in this direction. That region of the image detail 10 of the road sign 1 which contains all potential contour points 6 is extracted. Said region may be, e.g., a rectangle, and the contour points 7 may be located on an edge of the rectangle or demarcate the rectangle. However, not all contour points 7 are necessarily located on the edge of the rectangle. The fact that edge regions of the information-bearing part 3 are sometimes cut off when extraction is performed is accepted. This information loss can be counteracted by increasing the number of scanning beams 5. Thus, only that region which is required for the unambiguous classification of the value or sign/symbol of the road sign 1 is subjected to further classification in this extraction procedure 9, thereby providing the additional possibility of recognizing and extracting contour points whose brightness gradient is not purely vertical or horizontal but also includes curved contours.

The extracted information-bearing part 3 shown in FIG. 4d is submitted to a second classification unit for semantic interpretation. In this case, said second classification unit determines the value "60". Thus, the road sign 1 is completely identified since the results of the first classification unit are known.

LIST OF REFERENCE NUMERALS 1 road sign
2 annular red edge
3 information-bearing part
4 boundary frame
5 scanning beam
6 potential contour points
7 contour points
8 center as starting point
9 extraction procedure
10 image detail
11 procedure step 1: preprocessing of the image detail
12 procedure step 2: scanning of the detail along radial beams
13 procedure step 3: gradient formation along the scanning beams
14 procedure step 4: forming of contour point hypotheses
15 procedure step 5: extraction of the contour of the numerical block
16 outputting of the numerical block
17 inner surface of the road sign

The invention claimed is:

1. A method for road sign recognition, in which images of a region surrounding the vehicle are acquired by a camera, image data of the camera are analyzed, wherein at least one image region that contains a potential road sign is determined,
the image region that contains the potential road sign is submitted to a first classification unit that identifies the potential road sign, on the basis of at least one class-specific feature, as a road sign belonging to a particular class having the class-specific feature,
characterized in that
a brightness or a color intensity of a surface of the road sign is analyzed along radially extending scanning beams starting from a defined starting point within the surface of the road sign, in a brightness or color intensity analysis that comprises a one-dimensional gradient formation of brightness values or color intensity values of pixels of the image data along the scanning beams,
potential contour points of an information-bearing part of the road sign are determined from results of the brightness or color intensity analysis,
a limited region of the surface of the road sign is extracted as an information-bearing part of the road sign that includes all determined potential contour points, and
the extracted limited region is submitted to a second classification unit for semantic interpretation.

2. The method according to claim 1, characterized in that the first classification unit defines the defined starting point for brightness analysis or color intensity analysis.

3. The method according to claim 1, characterized in that the center of the surface of the road sign is determined and used as a defined starting point.

4. The method according to claim 1, characterized in that the first classification unit determines the inner surface of the road sign of a particular class and the brightness or color intensity analysis along the scanning beams is only performed within the inner surface of the road sign.

5. The method according to claim 4, characterized in that a region of a bright-background road sign for which the potential contour points were determined as dark-to-bright transitions during the brightness analysis performed along the scanning beams from the starting point outward is extracted as an information-bearing part.

6. The method according to claim 4, characterized in that a region of a dark-background road sign for which the potential contour points were determined as bright-to-dark transitions during brightness analysis performed along the scanning beams from the starting point outward is extracted as an information-bearing part.

7. The method according to claim 1, characterized in that the region of the road sign which is extracted as an information-bearing part is determined as a smallest rectangle that includes all said potential contour points.

8. The method according to claim 1, characterized in that the image data of the road sign is subjected to
a) brightness normalization and/or
b) noise suppression and/or
c) masking a surrounding region of the road sign that surrounds the surface,
prior to the brightness or color intensity analysis.

9. The method according to claim 1, characterized in that the brightness or color intensity analysis of the surface of the road sign is performed along a particular number of the radially extending scanning beams, wherein the number of radially extending scanning beams depends on the determined number of image regions with potential road signs in a camera image or on the number of the road signs identified in a camera image by the first classification unit.

10. The method according to claim 1, characterized in that
the brightness or color intensity analysis of the surface of the road sign is performed along a predetermined minimum number of the radially extending scanning beams,
the limited region extracted on the basis of brightness analysis or color intensity analysis is submitted to the second classification unit for semantic interpretation, and
if the second classification unit cannot classify the extracted limited region successfully, the number of scanning beams is increased before again performing the brightness or color intensity analysis and extraction of the region.

11. The method according to claim 10, characterized in that the number of scanning beams is only increased up to a defined maximum number.

12. The method according to claim 1, characterized in that all angles between adjacent scanning beams are the same.

13. The method according to claim 1, characterized in that twenty-four scanning beams radially extending from the starting point outward are provided, wherein all angles between adjacent scanning beams (5) are each 15°.

14. A device for performing the method for road sign recognition according to claim 1, said device comprising a camera for acquiring images of a region surrounding the vehicle and an image processing unit with a first classification unit that comprises means for determining the information-bearing part of the road sign from the image data of the camera, and for forwarding the extracted region of the road sign that comprises the information-bearing part to a second classification unit for semantic interpretation.

15. A method for road sign recognition, in which images of a region surrounding the vehicle are acquired by a camera,
image data of the camera are analyzed, wherein at least one image region that contains a potential road sign is determined,
the image region that contains the potential road sign is submitted to a first classification unit that identifies the potential road sign, on the basis of at least one class-specific feature, as a road sign belonging to a particular class having the class-specific feature,
characterized in that
a brightness or a color intensity of a surface of the road sign is analyzed along radially extending scanning beams starting from a defined starting point within the surface of the road sign,
potential contour points of an information-bearing part of the road sign are determined from results of the brightness or color intensity analysis,
a limited region of the surface of the road sign is extracted as an information-bearing part of the road sign that includes all determined potential contour points, and
the extracted limited region is submitted to a second classification unit for semantic interpretation,
wherein the brightness or color intensity analysis is performed from the starting point outward along the scanning beams, and
wherein the limited region that is extracted as the information bearing part is a region of a bright-background road sign for which the potential contour points were determined as dark-to-bright transitions, or is a region of a dark-background road sign for which the potential contour points were determined as bright-to-dark transitions, respectively in the brightness or color intensity analysis.

16. A method of automatically evaluating a road sign in a driver assistance system in a motor vehicle, comprising steps:
a) with a camera capturing image data of surroundings of the motor vehicle including a road sign;
b) in an image processing arrangement, analyzing the image data to thereby recognize that there is a road sign represented in the image data;
c) in the image processing arrangement, after optionally pre-processing the image data, evaluating a brightness or a color intensity of selected pixels of the image data representing at least a portion of the road sign, wherein the selected pixels are located only along scanning beams that extend radially from a starting point within the road sign represented in the image data;
d) in the image processing arrangement, from results of the evaluating in the step c), determining image contour transition points along the scanning beams and defining a limited region of the road sign represented in the image data, whereby the limited region is bounded by outermost ones and encompasses all of the image contour transition points;
e) in the image processing arrangement, extracting a portion of the image data, which portion falls within the limited region, as an information-bearing part of the road sign represented in the image data; and
f) at least one of: (I) visually displaying the portion of the image data on a display device in the motor vehicle, and/or (ii) providing the portion of the image data to further processing.

17. The method according to claim 16, further comprising the further processing in the step f), which comprises performing a semantic interpretation on the portion of the image data to determine an information content of the information-bearing part of the road sign.

18. The method according to claim 16, wherein the evaluating of the brightness or the color intensity of the selected pixels in the step c) comprises a one-dimensional gradient formation of brightness values or color intensity values of the selected pixels along the scanning beams.

19. The method according to claim 16, wherein the analyzing of the image data in the step b) further comprises classifying the road sign into a particular sign class by recognizing at least one class-specific feature of the road sign represented in the image data.

20. The method according to claim 16, wherein the step c) comprises the pre-processing of the image data, which pre-processing comprises recognizing and then masking or omitting the image data that represents an outer portion or a border of the road sign, or establishing a limited length for the scanning beams so that the scanning beams do not extend to the outer portion or the border.

* * * * *